March 24, 1931.  E. HANDLER  1,797,684
FORMATION OF STORAGE BATTERY ELECTRODES AND CONNECTIONS
Filed Aug. 17, 1929  2 Sheets-Sheet 1
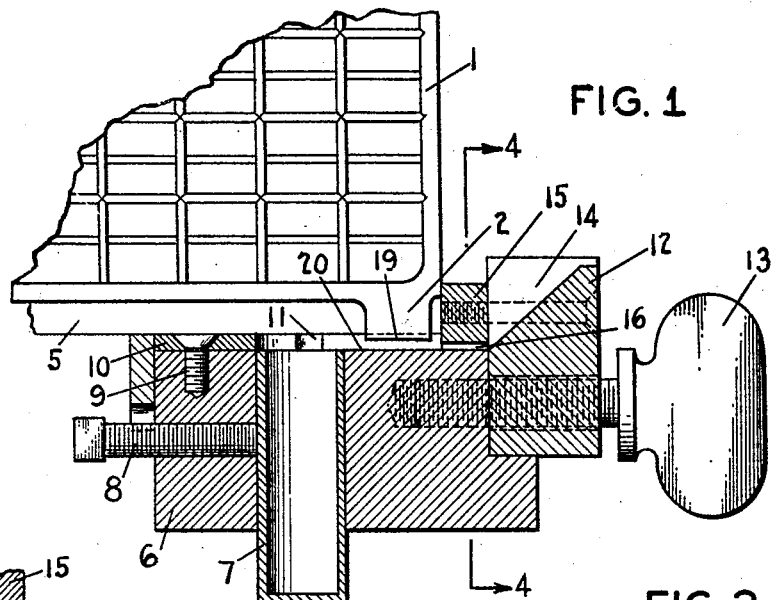
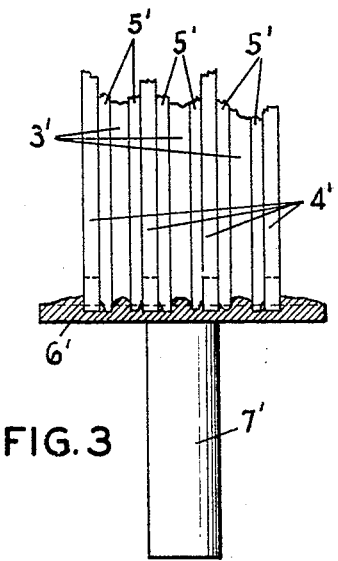
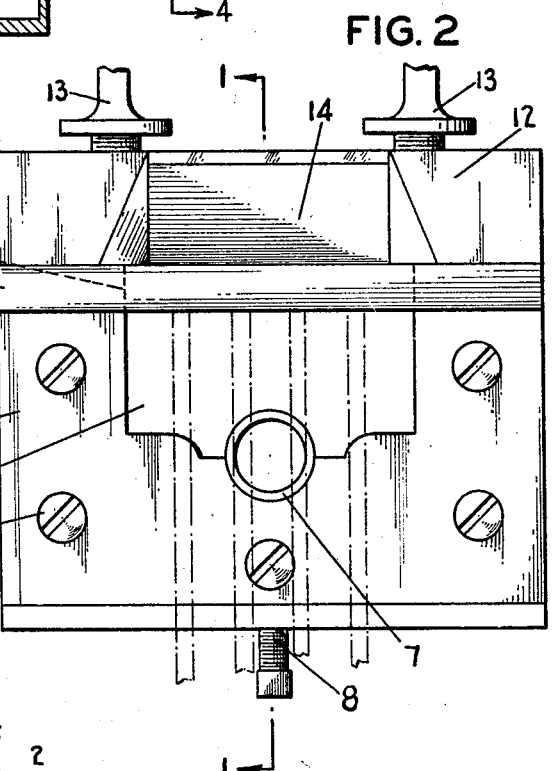
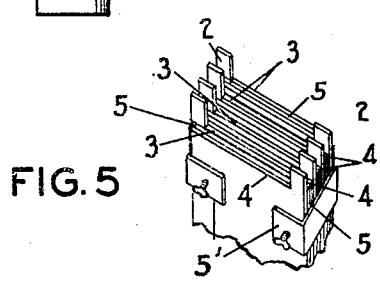
E. Handler INVENTOR
BY
Thomas Howe ATTORNEY March 24, 1931.  E. HANDLER  1,797,684

FORMATION OF STORAGE BATTERY ELECTRODES AND CONNECTIONS

Filed Aug. 17, 1929   2 Sheets-Sheet 2

E. Handler INVENTOR

BY Thomas Howe ATTORNEY

Patented Mar. 24, 1931

1,797,684

UNITED STATES PATENT OFFICE

EUGENE HANDLER, OF MONTCLAIR, NEW JERSEY

FORMATION OF STORAGE-BATTERY ELECTRODES AND CONNECTIONS

Application filed August 17, 1929. Serial No. 386,531.

This invention relates to the formation of electrodes for storage batteries and the like and connections.

In forming storage battery electrodes it is customary, either with plates of the Planté or Fauré type, to secure the plates together by burning a connecting strap or bar of lead to lugs upon the battery plates, whereby the plates are secured together both electrically and mechanically and a post for making external connections with the electrode is ordinarily mounted upon the connecting bar or strap for the plates as above referred to.

When the plates have been secured together by the connecting bar, as above indicated, to form the electrode, it would be difficult, if not impossible, to perform operations on the plates as for instance, to "paste" the plates when of the Fauré type. In the battery, of the Fauré type, the plates, having been pasted with the active material, are connected together by burning the connecting bar to the lugs of the plates forming the electrode. The electrodes of opposite polarity having been thus formed, the plates of the electrodes are sandwiched with each other, and separators inserted between the plates in a well understood manner. There are many objections to burning the connecting bar or strap to the lugs on the plates both as to quality of product and facility of manufacture. Great improvements may be attained by casting this connecting bar on to the plate lugs. Also it is of great advantage to cast the connectors between cells of a battery to posts of the electrodes.

It is an object of the invention to provide improvements in relation to the connecting together of electrodes and the plates thereof.

It is a further object of the present invention to provide improvements in casting the connecting bars or straps on to the plate lugs.

It is a further object of the invention to provide improvements in casting the connecting post on the connecting bar in conjunction with the casting of the bar on to the plate lugs.

It is a further object of the invention to provide improvements in the manner of connecting the electrodes of different cells.

Other and ancillary objects of the invention will appear hereinafter.

In the accompanying drawings which illustrate the invention—

Fig. 1 is a view showing a pasted battery plate (partly broken away) in side elevation and the mold in vertical section on the line 1—1 of Fig. 2;

Fig. 2 is a top plan view of the mold, the plates to be operated on being indicated by dotted lines;

Fig. 3 is an end elevation (partly broken away) of a battery electrode with the connecting bar or strap in section showing the relation of the separators, plates and strap in the electrode;

Fig. 5 is a perspective view of an assembled unit of plates and separators ready to have connecting bars and terminal posts cast on to the lugs of the plates;

Fig. 6 is a fragmentary view showing a modification;

Figure 7:
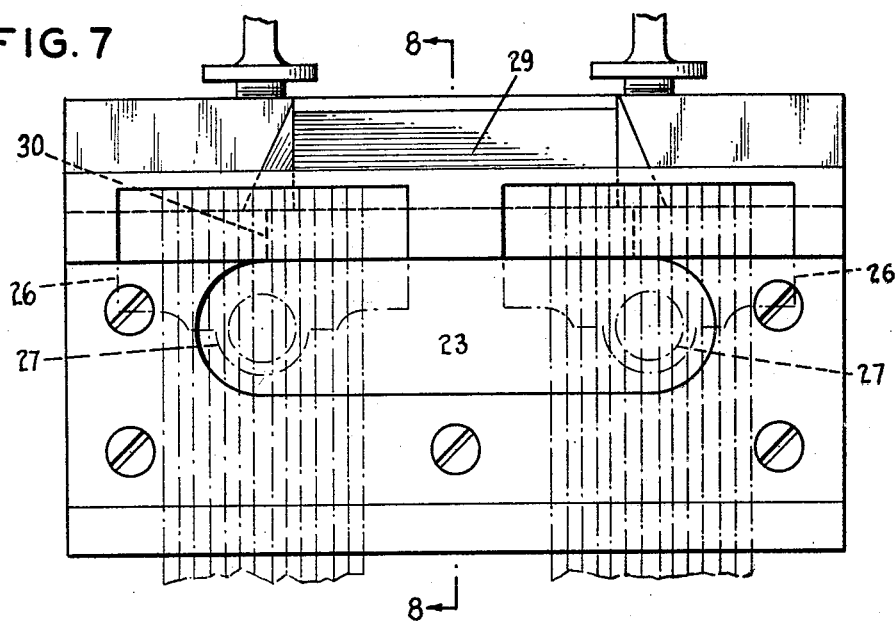
Fig. 7 is a bottom plan view of a mold adapted to apply a connector between the posts of electrodes of different cells.

Referring to the drawing and first to Figs. 1 to 5, the grid 1 of antimonious lead is pasted with active material to form a battery plate of the Fauré type as is well understood, this grid having the usual lug 2 whereby the plates may be connected together. In forming the battery, the unitary structure of plates for each element, both positive and negative, is assembled as shown in Fig. 5, there being battery plates 3 of one polarity sandwiched between battery plates 4 of the other polarity, such plates being separated from each other by the usual wooden separators 5 interposed between adjacent plates. In so assembling, the lugs 2 of a set of plates of one polarity project as shown and at the opposite side of the unit similar lugs upon plates of the opposite polarity extend as clearly appear in Fig. 5. The wooden separators are so assembled with relation to the plates that they extend beyond the edges of the plates as clearly shown in Fig. 1. The plates and separators are clamped together into a unit by means of clamps 5'.

In order to cast the connecting bar to the lugs 2 of the plates, a mold is provided which may be described as follows:

An iron block 6 has drilled in it a hole within which is secured a sleeve 7 by means of the set screw 8. Secured to the top of the block 6 by means of screws 9 is a plate 10 which has cut in it a recess 11, the walls of this recess serving to enclose a space within which the connecting bar or strap is cast. Also secured to the one side of the block 6 is an iron block 12 which is removably secured in position by means of thumb screws 13. This block 12 has at its top a recess 14 with an inclined bottom as shown, which, with the iron bar 15 suitably secured in front of the recess 14, forms a hopper-like arrangement within which the molten lead from which the terminal post and strap are formed, is poured.

The bar 15 is separated from the mold block 6 by a space 16 of suitable width which forms a connecting passage between the recess 14 and the recess 11, so that lead poured into the recess 14 passes through the passage 16 (which extends substantially the whole width of the recess 11), passes into a recess 11 and thence into the receptacle 7 within which the terminal post is formed.

In the operation of casting the strap and terminal post on to the plates, the body of plates assembled and clamped together in a unit as above described is placed so that it rests upon the plate 10 by means of the wooden separators 5, the lugs 2 extending within the recess 11.

Molten lead is then poured into the recess 14 and passes through the passage 16. This passage limits the flow of the lead so that only a given amount can be fed into the recess 11 and then passes on into the sleeve 7. The sleeve 7 having become filled the molten lead will pond up in the recess 11 and rise to a point where it will surround and become integral with the lugs 2 thereby connecting them together, and it will be observed that at the same time the terminal post 7' formed upon the cavity 7 will be integral with the connecting bar so that upon cooling of the molten lead the plates will be mechanically and electrically secured together and the terminal post 7' will be formed integral with the connecting bar 6' so that the unit will appear as shown in Fig. 3 of the drawings, wherein 4' are one polarity of plates having cast upon them the connecting strap 6', and with which is integrally cast the terminal post 7', while 5' are the wooden separators and 3' are the plates of opposite polarity.

If, when the lead is flowing from the passage 16 to the recess 7, it comes in contact with any considerable part of the lower face of the lugs 2 they will be liable to become fused or melted in the molten lead and carried away and the joint between the bar and the lug may be distorted and unreliable. The molten lead, therefore, in flowing beneath the plate lugs should not come in contact with them to such extent as to melt and carry them away, but the operation is so regulated and the adjustment so made that the molten lead in flowing to the cavity 7 for forming the terminal post will not contact with such lugs, but the molten lead will flow to the post cavity without such action upon the plate lugs and then, after that cavity has been filled the lead will pond up in the cavity for forming the connecting bar, rising substantially perpendicularly and without flowing past the lugs. The lugs, having, by the flow of the molten lead beneath them to the post forming cavity, been heated up to the point where a small further application of heat will cause them to become molten, when the perpendicular rise of the molten lead up to and about the lugs will supply the additional heat, the molten lead will not be chilled, and the lugs will become molten and coalesce with the molten metal of the bar without distortion or deleterious action upon the lugs as would be caused if there were currents in the lead transverse to the lugs.

According to the apparatus and process of Fig. 1 and lugs 2 are substantially square ended and their lower faces 19 are removed from the bottom 20 of the cavity 11 by a suitable space. The height of the passage 16 is made such with relation to the space between the lug bottom 19 and the cavity bottom 20 that lead fed into the cavity 11 through the passage 16 cannot reach the bottom of the lugs as the molten lead passes to the cavity 7 but can only reach those lugs after the cavity 7 has filled up and, with practically no current in the lead in the cavity 11, the molten lead ponds up until it coalesces with the bottom of the lugs 2. By reason of the fact that the current of lead flowing to the cavity 7 for the post does not touch the plate lugs 2 but only touches those lugs after the molten lead has filled the terminal forming cavity and has ponded up to the necessary degree in the cavity 11, the lugs are not distorted and a reliable joint by the coalescing of the lugs that the ponded molten lead is secured.

It will be understood that the mold may be heated as is well understood in the art to maintain the cast lead molten as may be desired.

According to the above apparatus, adjustments and method, the molten lead flowing to the terminal post forming cavity does not contact with the lugs, but contact between the molten lead and lugs is only made after the filling of the post forming cavity and the ponding up of the molten lead perpendicularly in the connecting bar forming recess or cavity, the plate lugs 2 not being in contact with the bottom of the cavity 11 at any point but removed therefrom by a suitable space so as to accomplish the results desired.

It is possible, however, that the desired results might be obtained if a small portion of the lug was in contact with the mold at the bottom of the molding cavity or extended into the molten stream of lead flowing to the terminal post forming cavity. This, however, should not exist to the extent that the lug would thus become molten and distorted or unreliable beyond a tolerable amount. It is therefore possible that the plate lug might extend within the molten lead stream flowing to the terminal post forming cavity or even touch the bottom of the mold, but this should be only partially of the width of the lug and not to such extent as to cause any deleterious consequence as to distort the lug or unreliability of joint with the connecting bar. Thus the lug 2' on the plate might be formed with an inclined lower face 19', the corner of which would touch the lower part of the mold 20', the level of the molten lead flowing to the terminal post forming cavity being indicated by the dotted line 21 (see Fig. 6). The molten lead would then melt off the lower point of the lug 2', but this would be insignificant because the molten lead would only contact a portion of the lower face of the lug and after the terminal post cavity had been filled the molten lead would pond up to a higher level than the top of the molten stream flowing in forming the terminal post, so that the ponded up lead would coalesce with a sound and undistorted portion of the lug. The extent to which the lug may contact with the molten lead stream or with the bottom of the mold as just referred to may vary under different circumstances and according to the desired results.

In the cases of both the square ended lug as shown in Fig. 1 and the inclined face lug as shown in Fig. 6, the ponded up level of the surface of the molten lead is higher than the surface of the molten lead stream flowing to the terminal post forming cavity so that the level of the lead at which it coalesces with the lugs is higher than the level of the current of molten lead flowing to the terminal post cavity.

Figure 8:
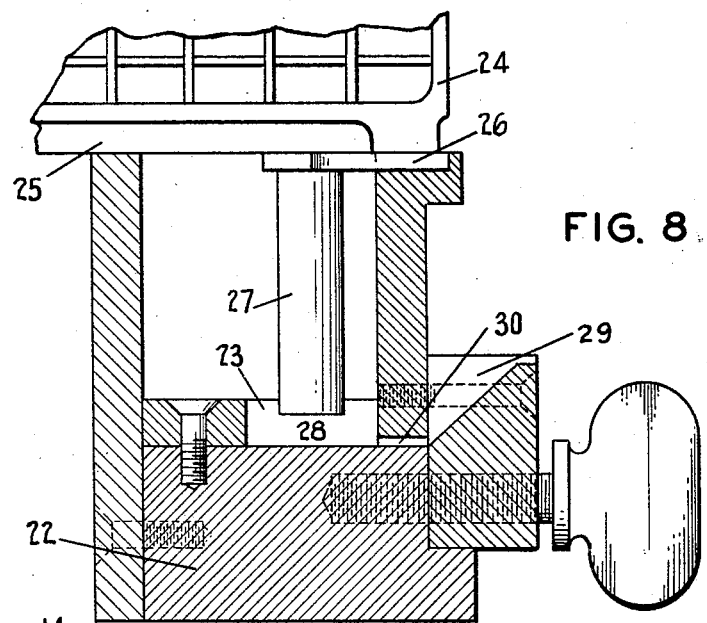
Fig. 8 is a section on the line 8—8 of Fig. 7.
Figure 4:
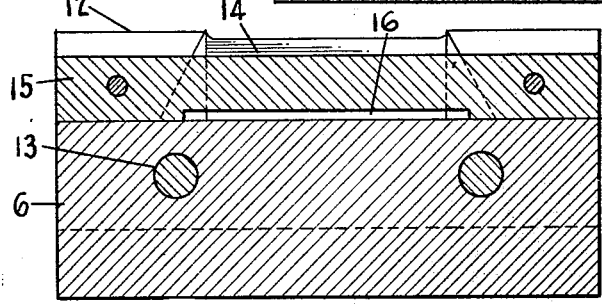
Fig. 4 is a section on the line 4—4 of Fig. 1.

The advantage of flowing the molten lead beneath the part to which the connector is to be cast, whereby the part is heated to the desired degree so that by the time the molten lead has ponded up sufficiently to contact the part it has been heated up so that the lead is not chilled etc. but a reliable joint formed, may be availed of in casting connectors onto lugs or terminals where a terminal post is not cast integral with the strap as well as where it is. Thus the invention may be availed of to cast the connectors onto the terminal posts of different cells. An apparatus whereby this may be carried out is shown in Figs. 7 and 8. Referring to those figures, a mold 22 is provided wherein is formed a recess 23 of a depth as shown in Fig. 8 and plan as shown in Fig. 7. These being the general dimensions and outline of the connector. Carried on a suitable support as shown are a plurality of cell units each comprising the usual assembly of pasted plates as 24 and wooden separators as 25, such units being clamped together. The plates 24 of one polarity are connected together by the strap 26 which is integrally formed or cast with the lugs of the plates and the terminal post 27 in a manner as hereinbefore described. The terminal posts 27 of the plurality of units have their ends depending in the recess 23 but the bottom faces do not extend to the bottom of the recess but are separated therefrom by a space 28. The different cellular units having been placed in position upon the support and their terminal posts projecting within the recess 23 as above described, molten lead is poured in the funnel 29 and passes through the slot 30 (which is practically coextensive with the recess 23) into the recess 23. It will be seen that the slot 30 is much narrower than the space 28 so that the terminal post will not be contacted by the molten lead until a sufficient time has elapsed for the molten lead fed through the comparatively narrow slot 30 has had time to accumulate to a sufficient extent. Meanwhile the lead of the post has had time to become heated from the molten lead beneath so that by the time it is contacted by the molten lead, the lead of the post will not chill the molten lead of the bath but will readily coalesce therewith forming a reliable joint. Also the rising of the lead in the recess 23 into contact with the post 27, being caused by the ponding up of the lead in the recess in a substantially perpendicular direction, and with no substantial cross current, so that there is no distortion, or damaging of the joint but, the molten lead in the recess 23 having ponded up about the terminal posts, it will coalesce therewith and, on cooling, a firm and reliable connector between the posts will have been formed.

While the invention has been illustrated in what are considered its best applications, it may have other embodiments and means of practice and its details may be varied without departing from its spirit. It is not therefor limited to practice with the structures shown in the drawings nor to the precise details recited but includes all matters within the appended claims.

What I claim is:

1. The method of casting a connecting bar and a terminal post to a battery plate having a lug, which consists in supporting the plate on a mold having a cavity for forming the bar and the post and an inlet to said mold adjacent to but below said lug, said plate being so positioned that the lug is between the inlet and the post cavity, only a portion of the lug extending into the mold, filling the post cavity by a stream of molten metal entering through said inlet horizontally, all of said metal passing in one direction to said post cavity without contacting with the lug and causing the molten metal to subsequently contact and coalesce with said lug.

2. The method of casting a connecting bar and a terminal post to a battery plate having a lug, which consists in supporting the plate on a mold having a cavity for forming the bar and the post and an inlet to said mold adjacent to but below said lug, said plate being so positioned that the lug is between the inlet and the post cavity, only a portion of the lug extending into the mold, filling the post cavity by a stream of molten metal entering through said inlet horizontally, all of said metal passing in one direction to said post cavity without contacting with more than a portion of the lower face of the lug and causing the molten metal to subsequently contact and coalesce with the entire lower face of said lug.

3. The method of casting a connecting bar and a terminal post to a battery plate having a lug, which consists in supporting the plate on a mold having a cavity for forming the bar and the post and an inlet to said mold adjacent to but below said lug, said plate being so positioned that the lug is between the inlet and the post cavity, only a portion of the lug extending into the mold, filling the post cavity by a stream of molten metal entering through said inlet horizontally, all of said metal passing beneath said lug in one direction to said post cavity without contacting with the lug and causing the molten metal to subsequently contact and coalesce with said lug.

4. The method of casting a connecting bar and a terminal post to a battery plate having a lug, which consists in supporting the plate on a mold having a cavity for forming the bar and the post and an inlet to said mold adjacent to but below said lug, said plate being so positioned that the lug is between the inlet and the post cavity, only a portion of the lug extending into the mold, filling the post cavity by a stream of molten metal entering through said inlet horizontally, all of said metal passing beneath said lug in one direction but without contacting with more than a portion of the lower face of the lug and causing the molten metal to subsequently contact and coalesce with the entire lower face of said lug.

5. The method of casting a connecting bar to a battery plate having a lug which consists in supporting the plate on a mold, said mold having an inlet adjacent to but below said lug, said plate being so positioned that the lug is between the inlet and the mold, only a portion of the lug extending into the mold supplying molten metal through said inlet horizontally, all of said metal passing in one direction beneath the lug but without contacting therewith, whereby the lug becomes heated, and subsequently causing the molten metal to rise in the mold into contact with said lug and to coalesce therewith.

6. The method of casting a connecting bar to a battery plate having a lug which consists in supporting the plate on a mold, said mold having an inlet adjacent to but below said lug, said plate being so positioned that the lug is between the inlet and the mold, only a portion of the lug extending into the mold supplying molten metal to the mold entering through said inlet horizontally beneath at least a portion of the lower face of the lug whereby the lug becomes heated and subsequently causing the molten metal to rise in the mold into contact with the lower face of said lug and to coalesce therewith.

7. The method of joining a lead battery part to a leaden connection which consists in supporting the part on a mold, said mold having an inlet below said part, said part being so positioned that only a portion of the part extends into the mold, supplying molten metal through said inlet horizontally to the mold but without contacting with said part and subsequently causing the molten lead to contact and coalesce with said part.

8. The method of joining a lead battery part to a leaden connection which consists in supporting the part on a mold, said mold having an inlet below said part, said part being so positioned that only a portion of the part extends into the mold, supplying molten metal through said inlet horizontally to the mold but without contacting with at least a portion of the lower face of said part and subsequently causing the molten lead to contact and coalesce with the greater portion of the lower face of said part.

9. The method of supplying a connecting strap and terminal post to the plates of a storage battery electrode having lugs which consist in assembling the plates and supporting them on a mold having cavities for forming the connecting strap and terminal post and an inlet to said mold adjacent to but below said lugs, said plates being so positioned that the lugs are between the inlet and the cavity for the post, only a portion of the lugs extending into the mold, supplying molten lead through said inlet horizontally to the post cavity, said molten lead passing horizontally in one direction through the strap cavity, beneath said lugs but out of contact therewith, and causing the molten lead to rise in the strap cavity, after the post cavity has been filled and contact and coalesce with said lugs.

10. The method of supplying a connecting strap and terminal post to the plates of a storage battery electrode having lugs, which consists in assembling the plates and supporting them on a mold having cavities for forming the connecting strap and terminal post and an inlet to said mold adjacent to and below said lugs, said plates being so positioned that the lugs are between the inlet and the cavity for the post, only a portion of the lugs extending into the mold, supplying molten lead through said inlet horizontally to the post cavity, said molten lead passing horizontally in one direction through the strap cavity, beneath said lugs but out of contact with at least a portion of the lower faces thereof, and causing the molten lead to rise in the strap cavity after the post cavity has been filled and contact and coalesce with a greater portion of the lower faces of said lugs.

In testimony whereof I have signed this specification this 7th day of August, 1929.

EUGENE HANDLER.